United States Patent [19]

Yanagihara

[11] Patent Number: 4,543,363

[45] Date of Patent: Sep. 24, 1985

[54] ION EXCHANGER HAVING HYDROXYL GROUPS BONDED DIRECTLY TO BACKBONE SKELETON

[75] Inventor: Yuzo Yanagihara, Yokohama, Japan

[73] Assignee: Asahi Kasei Kogyo Kabushiki Kaisha, Osaka, Japan

[21] Appl. No.: 618,449

[22] Filed: Jun. 7, 1984

[30] Foreign Application Priority Data

Jun. 15, 1983 [JP] Japan ................... 58-105942
Jan. 17, 1984 [JP] Japan ..................... 59-6058
Jan. 20, 1984 [JP] Japan ..................... 59-8261

[51] Int. Cl.$^4$ ............................. B01J 1/08; C08F 5/20
[52] U.S. Cl. ........................................................ 521/38
[58] Field of Search ........................... 521/28, 30, 38; 526/261

[56] References Cited

U.S. PATENT DOCUMENTS

| | | | |
|---|---|---|---|
| 3,507,851 | 4/1970 | Ghetie et al. | |
| 3,767,600 | 10/1973 | Albright | 521/38 |
| 3,991,018 | 11/1976 | Strop et al. | |
| 4,097,420 | 6/1978 | Mikes et al. | |
| 4,104,209 | 8/1978 | Mikes et al. | 521/30 |
| 4,120,831 | 10/1978 | Kuznetsova | 526/261 |
| 4,139,684 | 2/1979 | Coupek et al. | |
| 4,358,546 | 11/1982 | Naomi et al. | 521/28 |

FOREIGN PATENT DOCUMENTS 57-63314 4/1982 Japan ..................... 526/261

*Primary Examiner*—Joseph L. Schofer
*Assistant Examiner*—Peter F. Kulkosky
*Attorney, Agent, or Firm*—Birch, Stewart, Kolasch & Birch

[57] ABSTRACT

An ion exchanger comprising a crosslinked copolymer and an ion exchange group, wherein an alcoholic hydroxyl group is bonded directly to the skeleton of a matrix of totally porous organic synthetic crosslinked copolymer. The ion exchanger has a predetermined hydroxyl group content, predetermined ion exchange group content, predetermined water regain value and predetermined specific surface area. The ion exchanger having a high mechanical strength and high chemical stability and not causing non-specific adsorption of bio-substances is useful as a high-speed liquid chromatography packing material and separating membrane, especially for bio-substances, such as protein, enzyme, peptide, amino acid, nucleotide or the like.

19 Claims, No Drawings

ION EXCHANGER HAVING HYDROXYL GROUPS BONDED DIRECTLY TO BACKBONE SKELETON

This invention relates to an ion exchanger. More particularly, this invention is concerned with an ion exchanger which comprises a matrix of a totally porous crosslinked copolymer, an alcoholic hydroxyl group and an ion exchange group. The ion exchanger is useful in various ways, for example, as a liquid chromatography packing material or separating membrane to be employed in separating biosubstances which are present in an aqueous medium.

Various methods are known in the art to separate the components of body fluids such as urine and serum and cytosols, which are, for example, a protein, enzyme, peptide, amino acid, nucleotide or the like. Of the various methods, liquid chromatography, especially gel permeation chromatography, in which an aqueous medium is advantageously utilized is more widely used in the fields of biochemistry, medicine and pharmacy, since it provides multi-component information at one time by relatively simple operations. The gel permeation chromatography is advantageous in that it permits direct input of urine, serum or the like into the apparatus for analysis. However, the gel permeation chromatography is not always suitable for separation of the bio-substance components which have close molecular weights. Therefore, in the recent years, attention has been drawn to a liquid chromatography procedure in which a packing material obtained by incorporating an ion exchange group in the conventional gel permeation chromatography packing material is used to realize the combined effect of the simplicity in operation characteristic of the gel permeation chromatography with the excellent separating capacity due to the action of ion exchange groups.

As such a gel permeation chromatography packing material having an ion exchange group, there may be mentioned, for example, a granular polymer obtained by attaching ion exchange groups to a natural polymer such as agarose and dextran, usually cross-linked, and cellulose. The granular polymer is actually being used for separation and analysis of bio-substances, such as protein and enzyme. In this respect, reference may be made to Roger Epton, "Chromatography of Synthetic and Biological Polymers; vol. 2 Hydrophobic Ion Exchange & Affinity Methods" pp 73–127, Ellis Horwood Ltd., New York, 1978. However, these packing materials obtained from such natural polymers are generally called soft gels. The soft gels, in the wet state, are inferior in mechanical strength. Hence, these packing materials cannot be utilized in high-speed liquid chromatography in which the packing material must be small-sized granules yet strong in mechanical strength. As far as the inventor's knowledge extends, there is no generally accepted definition for the terminology "high speed." The criterion for the terminology varies with the granule diameter and column size. The "high speed" used herein means about 1 ml/min or more with respect to the passing of a mobile phase in conducting chromatography, under a high pressure applied by a pump, using a column of several millimeters in inside diameter in which a packing material composed of granules with a size as small as 50 microns or less is charged. In this respect, reference may be made to J. J. Kirkland, "Modern Practice of Liquid Chromatography", John Wiley & Sons, New York, 1971.

As another example of the known gel permeation chromatography packing material having an ion exchange group, there may be mentioned derivatives of a copolymer of a monomer having a hydroxyl group, such as 2-hydroxyethyl methacrylate, and an alkylene glycol di(meth)acrylate, such as ethylene glycol dimethacrylate. These copolymer derivatives are disclosed in U.S. Pat. No. 4,139,684. It is noted that in these copolymers, a hydroxyl group is bonded to a pendant group of the copolymer, and that hence, the hydroxyl group is not bonded directly to the skeleton of the matrix of the copolymer. The terminology "skeleton of the matrix" as used herein means a backbone structure of the matrix, which does not include functional groups, such as groups of the formula —OH, —OCOCH$_3$, —OCH$_2$COOH, —OCH$_2$CH(OH)CH$_2$N(C$_2$H$_5$)$_2$, —OCH$_2$CH$_2$CH$_2$SO$_3$H or the like. Although these copolymers give a packing material having a relatively high mechanical strength thereby to be useful for high-speed liquid chromatography, they have a drawback in that they tend to disadvantageously adsorb thereto proteins, enzymes and other bio-substances non-specifically in an aqueous medium (hereinafter, this phenomenon is frequently referred to as "non-specific adsorption of bio-substances"). Therefore, these copolymers are also limited in their applications. With respect to the characteristics of these copolymers, reference may be made to Roger Epton, "Chromatography of Synthetic and Biological Polymers; vol. 1 Column Packings, GPC, GF and Gradient Elution" page 91, Ellis Horwood Ltd., New York, 1978.

As a further example of the known gel permeation chromatography packing material having an ion exchange group, there may be mentioned cation exchangers comprising a copolymer of styrene and divinylbenzene. It is noted that the copolymer is hydrophobic due to the absence of hydrophilic groups, such as hydroxyl group. With respect to the copolymer, reference may be made to K. Dorfner, "Ion Exchangers Properties and Applications", pages 15–40, Ann. Arbor Science Publishers, Inc., Michigan, U.S.A., 1972. Although the copolymer is excellent in mechanical strength and resistance to chemicals, the use of the copolymer for high-speed chromatography of bio-substances is also limited since it disadvantageously tends to cause the abovementioned non-specific adsorption of bio-substances.

As a still further example of the known gel permeation chromatography packing material having an ion exchange group, there may be mentioned an ion exchanger comprising silica gel and, bonded thereto, an ion exchange group. This inorganic ion exchanger is disclosed in Japanese Patent Application Laid-Open Specification No. 55-66756/1980. Although this inorganic ion exchanger is excellent in mechanical strength, the use of the material for high-speed chromatography of bio-substances is very limited since its chemical stability, especially alkali resistance, is very low.

Therefore, there is still a strong demand in the art for a more useful ion exchanger that can be effectively utilized for high-speed chromatography of bio-substances.

We have made intensive studies on the effect of polymer configuration, polymer components, functional groups and other factors on the performance of the resulting ion exchanger. As a result, it has unexpectedly been found that a totally porous organic synthetic crosslinked copolymer exhibiting a specific water regain value and a predetermined specific surface area and containing, in specific contents, a hydroxyl group and an ion exchange group gives an excellent ion exchanger which can be advantageously utilized for high-speed liquid chromatography of bio-substances. Based on this novel finding, we have completed this invention.

It is, therefore, an object of the present invention to provide a novel ion exchanger which is excellent in mechanical strength and resistance to chemicals and permits effective separation, by ion exchange, of bio-substances inclusive of low molecular electrolytes and proteins, thereby being advantageously utilized as a liquid chromatography packing material or separating membrane useful for separation of bio-substances, especially those which are present in an agueous medium.

The foregoing and other objects, features and advantages of the present invention will be apparent to those skilled in the art from the following detailed description and appended claims.

According to the present invention, there is provided an ion exchanger which comprises:

a matrix of a totally porous organic synthetic crosslinked copolymer comprising a skeleton and functional groups bonded to said skeleton;

an alcoholic hydroxyl group bonded directly to said skeleton, the content of said hydroxyl group being in the range of 1.0 to 14.0 meq/g of the dry ion exchanger;

an ion exchange group bonded to said matrix, the content of said ion exchange group being in the range of 0.02 to 5.0 meq/g of the dry ion exchanger, and wherein said ion exchanger has a water regain value of 0.5 to 4.0 g/g of the dry ion exchanger and a specific surface area of 5 to 1000 m²/g of the dry ion exchanger.

The ion exchanger of the present invention is totally porous. The terminology "totally porous" as used herein means that fine pores are distributed throughout the matrix of the ion exchanger.

In the ion exchanger of the present invention, an alcoholic hydroxyl group is bonded directly to the skeleton of a matrix of organic synthetic crosslinked copolymer. An example of a matrix having an alcoholic hydroxyl group bonded directly to the skeleton thereof is one comprising vinyl alcohol monomer units. By the terminology "vinyl alcohol monomer units" is meant a moiety of the formula:

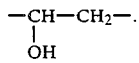

In the present invention, it is preferred that the content of an alcoholic hydroxyl group of the dry ion exchanger be in the range of 1.0 to 14.0 meq/g, especially 1.0 to 11.0 meq/g. The ion exchanger having a hydroxyl group content of 1.0 to 14.0 meq/g exhibits hydrophilicity, and prevents hydrophobic adsorption of water-soluble substances thereto in an aqueous medium. The hydroxyl group content of 1.0 to 11.0 meq/g is more preferred from the viewpoint of minimizing the above-mentioned hydrophobic adsorption of water-soluble substances while ensuring a high mechanical strength for the matrix. The content of an alcoholic hydroxyl group contained in the ion exchanger may be determined by reacting the hydroxyl groups with acetic anhydride in a pyridine solvent, measuring the amount of acetic anhydride consumed for the reaction with the hydroxyl groups or a weight change of the ion exchanger, and calculating from the resulting measured value. When 1 milli-mole of acetic anhydride is consumed for the reaction with 1 g of a dry ion exchanger, the content of an alcoholic hydroxyl group is 1 meq/g of the ion exchanger. It should be noted, however, that certain kinds of ion exchange groups also react with acetic anhydride. In such a case, the hydroxyl group content may be determined by subtracting the ion exchange group content determined in the later described manner from that calculated from the amount of acetic anhydride consumed.

The ion exchanger of the present invention has an ion exchange group bonded to the matrix. The suitable ion exchange groups to be used in the present invention are, for example, weakly acidic cation exchange groups such as carboxyl and phosphoric groups, weakly basic anion exchange groups such as primary, secondary and tertiary amino groups, strongly acidic cation exchange groups such as sulfonic group, and strongly basic anion exchange groups such as quaternary ammonium salt group. These ion exchange groups may be used either singly or in combination.

In the present invention, it is preferred that the content of an ion exchange group of the dry ion exchanger be in the range of 0.02 to 5.0 meq/g, especially 0.05 to 2.0 meq/g. The ion exchanger with an ion exchange group content of 0.02 to 5.0 meq/g exhibits various chemical behaviors due to the ion exchange groups, for example, ion exchanging or fractionation of water-soluble substances in an aqueous medium by ion exchange, while having a sufficient mechanical strength so that it is useful as a packing material for high-speed liquid chromatography. In actual use, it is usually more preferable to employ an ion exchanger having an ion exchange group content of 0.05 to 2.0 meq/g. The content of an ion exchange group of the dry ion exchanger may be determined by various known methods that have been employed for the measurement of the exchange capacities of customary ion exchange resins. In this respect, reference may be made to K. Dorfner, "Ion Exchangers Properties and Applications", pages 40-44, Ann. Artor Science Publishers, Inc., Michigan, U.S.A., 1972.

With respect to the ion exchanger of the present invention, the matrix comprises a totally porous organic synthetic crosslinked copolymer comprising a skelton and functional groups bonded to the skelton. Ihe meaning of the terminology "skeleton is as defined hereinbefore. The terminology "functional groups" as used herein means any groups pendent to the skeleton such as, for example, those of the formulae —OCOCH₃, —OCOC₂H₅, —OCH₂COOH, —OCH₂CH(OH)CH₂N(C₂H₅)₂ and —OCH₂CH₂CH₂SO₃H. The functional groups usually originate from the monomers subjected to copolymerization. However, they may be bonded to the skeleton of the copolymer after copolymerization reaction. The structure of the matrix is not critical. However, it is preferred that the matrix comprise vinyl compound monomer units and crosslinkable monomer units. The matrix comprising vinyl compound monomer units and crosslinkable monomer units may be obtained by customary copolymerization of a vinyl compound monomer and a crosslinkable monomer, as described later. Any kind of vinyl compound monomer unit may be incorporated in the matrix of the ion exchanger of the present invention. Suitable examples of the vinyl compound monomer unit are those obtained from a vinyl carboxylate monomer, such as vinyl acetate, vinyl propionate, vinyl butyrate, vinyl valerate, vinyl pivalate and divinyl adipate. With respect to the crosslinkable monomer unit, also, any kind of crosslinkable monomer unit may be incorporated in the matrix of the ion exchanger of the present invention. The suitable crosslinkable monomer units are, for example, those obtained from a crosslinkable monomer having an isocyanurate ring, such as triallyl isocyanurate and diallyl isocyanurate, and from a crosslinkable monomer having a triazine ring, such as triallyl cyanurate. The suitable crosslinkable monomer units are also obtained from epichlorohydrin or a bisepoxy compound such as ethylene glycol diglycidyl ether, diethylene glycol diglycidyl ether and butane diol diglycidyl ether. These compounds may react with a hydroxyl group-containing compound to form a totally porous organic synthetic crosslinked copolymer. Of the above-cited crosslinkable monomer units, that from triallyl isocyanurate is particularly preferable because copolymerizability of triallyl isocyanurate with a vinyl carboxylate monomer is excellent, and because it gives a matrix having a good chemical resistance.

The ion exchanger of the present invention may preferably be such that with respect to an crosslinking index (X), it satisfies an inequality $0.05 \leq X \leq 0.4$. The terminology "crosslinking index" as used herein is defined by the formula:

$$X = \frac{nb}{a + nb}$$

in which a represents the molar fraction of the total monomer units minus the crosslinkable monomer units relative to the total monomer units constituting the matrix, b represents the molar fraction of the crosslinkable monomer units relative to the total monomer units constituting the matrix, and n represents the number of functional groups active in chain extension which are contained in a molecule of crosslinkable monomer that forms the crosslinkable monomer units upon polymerization.

In the above definition, the terminology "functional groups active in chain extension" mentioned with respect to the n means, for example, a vinyl group and epoxy group. In the case of epihalohydrin, n is exceptionally 2, since the following reaction occurs therewith:

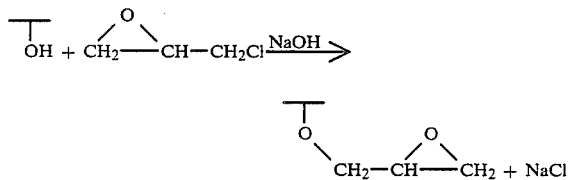

The ion exchanger with crosslinking index of 0.05 to 0.4 has a sufficient mechanical strength as well as hydrophilicity due to non-ionic hydrophilic groups. The hydrophilicity due to non-ionic hydrophilic groups is needed to prevent undesirable interactions between the ion exchanger and the substances to be separated. When an especially high mechanical strength is needed as in the case of a packing material for high-speed liquid chromatography, it is preferred that the crosslinking index be in the range of 0.2 to 0.4.

To ensure both high separating capacity and high mechanical strength, it is necessary that the water regain value ($W_R$) of the ion exchanger according to the present invention be in an appropriate range. It is noted that the known ion exchanger from crosslinked agarose or crosslinked dextran, as mentioned hereinbefore, exhibits a high water regain value, and its mechanical strength, especially in the wet state, is very low. This trend is especially apparent when the pore size of the ion exchanger is large. The ion exchanger of the present invention has generally a water regain value of 0.5 to 4.0 g/g, preferably 0.5 to 3.0 g/g of the dry ion exchanger. The $W_R$ value is the amount of water that can be contained in the pores of the ion exchanger when the ion exchanger is equilibrated with water, per unit weight of the ion exchanger in the dry state. In short, the $W_R$ value can be a criterion indicating the quantity of pores within the ion exchanger. As the $W_R$ value is increased, the weight of the skeleton-constituting portion of the ion exchanger in water, namely, the weight of the ion exchanger per se, is relatively decreased. Accordingly, if the $W_R$ value is too large, the mechanical strength of the ion exchanger is reduced. If the $W_R$ value is too small, since the quantity of pores in the ion exchanger is reduced, the separating capacity of the ion exchanger is lowered. Therefore, from the viewpoint of the physical prperties and separating capacity of the ion exchanger, it is preferable that the $W_R$ value be within the above-defined range. The $W_R$ value can be determined by subjecting an ion exchanger sufficiently equilibrated with distilled water to centrifugation to remove the water adhering to the surface of the ion exchanger, measuring the weight ($W_1$) of the ion exchanger, drying the ion exchanger, measuring the weight ($W_2$) of the ion exchanger after drying and calculating the $W_R$ value according to the following formula:

$$W_R = \frac{W_1 - W_2}{W_2}.$$

The ion exchanger of the present invention comprises a totally porous crosslinked copolymer which is rigid so that it has a large specific surface area in the dry state. In general, an organic synthetic polymer comprising a crosslinking structure is swollen in a solvent having affinity with the polymer, and shrinks in the dry state. In the soft gel, the pores filled with a solvent in the wet state are maintained only by the meshes in the network structure formed by crosslinking. Hence, in the case of the soft gel, the abovementioned shrinkage is grave. The soft gel has a desired pore size when swollen in a solvent, but in the dry state, the soft gel shrinks so that the pores substantially disappear. When the pores substantially disappear, the specific surface area of the polymer comes to represent only the outer part of the polymer, which is usually less than 1 m$^2$/g. On the other hand, in the case of a totally porous crosslinked copolymer having a rigid structure, the pore size does not substantially vary whether the copolymer is in the swollen state or in the dry state. That is the copolymer which are usually called permanent pores. The ion exchanger of the present invention generally has a specific surface area of 5 to 1000 m$^2$/g in the dry state. An ion exchanger having a specific surface area larger than 1000 m$^2$/g is disadvantageous in that its mechanical strength becomes poor. On the other hand, an ion exchanger having a specific surface area smaller than 5 m$^2$/g has a substantially uniform structure in which there is no significant amount of pores. Hence, such an ion exchanger cannot be suitably employed as a packing material for high-speed liquid chromatography. Various methods are known for the determination of specific surface area. In the present invention, the specific surface area is determined according to the most popular BET method using nitrogen gas. The sample to be used for the determination of specific surface area should be sufficiently dried. However, since it is difficult to dry the ion exchanger of the present invention because of a high hydrophilic characteristic in order to determine the specific surface area, it is preferred that the ion exchanger be first equilibrated with acetone and then dried under reduced pressure at a temperature lower than 60° C.

The form of the ion exchanger of the present invention is not critical. According to need, the ion exchanger may take any form, for example, granular, membranous, fibrous or lump form. When the ion exchanger is used as a liquid chromatography packing material, it is preferred that it take a granular form, especially a spherically granular form. In that case, the granule size may not be critical. It is, however, generally in the range of 3 to 500 microns in terms of weight average granule diameter. In particular, when the ion exchanger is used as a packing material for high-speed liquid chromatography, it may be preferred that the weight average granule size be in the range of 3 to 20 microns, especially 3 to 15 microns.

Now, a preferred mode of the process for the preparation of the ion exchanger of the present invention will be descirbed. The process by which the ion exchanger of the present invention is prepared is by no means limited to the process described below.

The ion exchanger of the present invention, for example, may be prepared by first copolymerizing a vinyl carboxylate monomer and a crosslinkable monomer to obtain a copolymer having ester groups as functional groups, second converting the ester groups to hydroxyl groups by saponification or ester interchange reaction, and third effecting an ion exchange group incorporation reaction, as described later, to a predetermined percentage of the resulting hydroxyl groups taking advantage of the reactivity of the hydroxyl groups. The vinyl carboxylate monomer to be employed in this process may contain one or more polymerizable vinyl carboxylate groups. As the suitable vinyl carboxylate monomer, there may be mentioned, for example, vinyl acetate, vinyl propionate, vinyl butyrate, vinyl valerate, vinyl pivalate and divinyl adipate. They may be used either alone or in mixture. Of these vinyl carboxylate monomers, vinyl acetate, vinyl propionate and divinyl adipate are preferred, because of the ease in copolymerization, saponification or ester interchange reactions and lower cost.

The suitable crosslinkable monomer to be employed in this process is, for example, a compound of the formula:

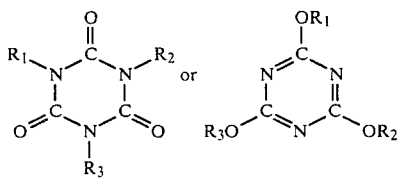

wherein $R_1$, $R_2$ and $R_3$ each independently represent $CH_2=CH-CH_2-$, $CH\equiv C-CH_2-$ or

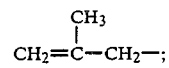

and any one of $R_1$, $R_2$ and $R_3$ may be a hydrogen atom. Of the above monomers, triallyl isocyanurate having a structure in which all of the $R_1$, $R_2$ and $R_3$ groups of the above left-side formula are $-CH_2-CH=CH_2$ is most prefered as a crosslinkable monomer, because its copolymerizability with a vinyl carboxylate monomer is excellent, and because its stability against ester interchange or saponification is excellent.

The crosslinked copolymer comprising vinyl carboxylate monomer units and crosslinkable monomer units may be prepared by any of the customary polymerization techniques, such as suspension polymerization, bulk polymerization and emulsion polymerization. Of these polymerization techniques, suspension polymerization is preferred for the purpose of obtaining a copolymer to be used as a liquid chromatography packing material. In the above copolymerization of a vinyl carboxylate monomer and a crosslinkable monomer, a third monomer other than the above cited monomers may be added without any adverse effect on the physical properties of the ultimate ion exchanger.

When a copolymerization reaction of a vinyl carboxylate monomer and a crosslinkable monomer is effected, at least one organic solvent capable of dissolving the monomers may be added to the monomers to form a copolymer having permanent pores, as mentioned hereinbefore, and to control the porosity, pore size and pore size distribution of the copolymer. As the suitable organic solvent capable of dissolving such monomers, there may be mentioned, for example, aromatic hydrocarbons such as toluene and mylene; aliphatic hydrocarbons such as heptane, octane, cyclohexane and decalin; aliphatic esters, such as n-butyl acetate, isobutyl acetate, n-hexyl acetate and dioctyl adipate; aromatic esters, such as dimethyl phthalate, dioctyl phthalate and methyl benzoate; and alcohols such as butanol, heptanol and octanol. When suspension polymerization is effected, it may be preferable to use an organic solvent having little solubility in water. Usually, 20 to 300 parts by weight of such an organic solvent are added to 100 parts by weight of the monomers to be copolymerized. In the production of a copolymer to be used for preparation of an ion exchanger that is useful as a packing material for high-speed liquid chromatography which must have a high mechanical strength, it may be more preferable to add 30 to 100 parts by weight of the organic solvent to 100 parts by weight of the monomers.

To control the pore size and pore size distribution of the ultimate ion exchanger and/or to increase the flexibility of the ultimate ion exchanger, either or both of a linear polymer and rubber which are soluble in the monomers may be added to the monomers. Suitably employed linear polymers and rubbers for the above purpose are, for example, polyvinyl acetate, polystyrene, chloroprene rubber and butadiene rubber. To 100 parts by weight of the monomers, 20 or less, preferably 10 or less parts by weight of such a linear polymer and/or rubber may be added to the monomers.

The kind and amount of the polymerization initiator to be employed in the above copolymerization reaction is not critical. They may be arbitrarily selected according to the copolymerization method employed. In the customary suspension polymerization or bulk polymerization, there may be used generally employable radical polymerization initiators, for example, azo type initiators such as 2,2'-azobisisobutyronitrile and 2,2'-azobis-(2,4-dimethylvaleronitrile), and peroxide type initiators such as benzoyl peroxide and lauroyl peroxide.

The saponification or ester interchange reaction of the resulting copolymer may be carried out using an acid or alkali in a solvent such as water, alcohols, or mixtures thereof. From the viewpoint of obtaining a packing material having a sufficient mechanical strength, it is preferred that the degree of saponification, namely the percentage of ester groups converted to hydroxyl groups relative to the total ester groups, be in the range of 10 to 80 %. The degree of saponification may be controlled by optimizing the kind of solvent, temperature, time and other reaction conditions.

To the thus obtained copolymer having hydroxyl groups, ion exchange groups may be bonded, for example, in any of the following manners.

A carboxyl group may be bonded to the copolymer by reacting a predetermined amount of hydroxyl groups of the copolymer with a dibasic acid anhydride such as succinic anhydride and glutaric anhydride, or a halogenated acetic acid such as monochloro acetic acid and monobromoacetic acid.

A sulfonic group may be bonded to the copolymer by reacting a predetermined amount of hydroxyl groups of the copolymer with propanesultone, butanesultone, 1,3,2,4-dioxadithiane-2,2,4,4-tetraoxide or the like.

A primary amino group, a secondary amino group and a tertiary amino group may be bonded to the copolymer by reacting a predetermined amount of hydroxyl groups of the copolymer with epichlorohydrin or a bisepoxy compound to form pendant epoxy groups and, subsequently, reacting the resulting epoxy groups with ammonia, ethylamine, diethylamine or the like. With respect to the incorporation of a tertiary amino group, it may alternatively be effected by reacting the hydroxyl groups with N-(2-chloroethyl)diethylamine in alkali.

An anion exchanger having a quaternary ammonium salt group may be obtained by, for example, reacting an ion exchanger having a tertiary amino group with methyl iodide, methyl chloride or the like.

The amount of ion exchange groups bonded to the copolymer may be varied by varying the relative amount of reactants and controlling the reaction conditions such as temperature and time.

The ion exchanger of the present invention may also be produced by the following method. A divinyl dicarboxylic ester such as divinyl adipate is polymerized and subjected to saponification in such a solvent as will not dissolve polyvinyl alcohol. The resulting polymer, in the above-mentioned solvent, is reacted with a compound having at least two functional groups which are capable of reacting with a hydroxyl group to form a covalent bond therebetween, such as epichlorohydrin and ethyleneglycol diglycidyl ether, thereby to obtain a crosslinked copolymer having vinyl alcohol units in which a hydroxyl group is bonded to a carbon atom of an vinyl monomer unit. Then, ion exchange groups may be incorporated into the thus obtained crosslinked copolymer in the manner as described hereinbefore to obtain an ion exchanger of the present invention.

The ion exchanger of the present invention is rigid and has an excellent mechanical strength. When the ion exchanger of the present invention is used as a packing material for liquid chromatography, an eluent can be passed at a high flow rate and, therefore, rapid analysis by liquid chromatography is possible.

Also, the ion exchanger of the present invention is stable in a wide range of pH. Accordingly, the ion exchanger of the present invention can be employed, stably without any property change, under alkaline conditions where, for example, a gel comprising a silica gel as its skeleton cannot be applied.

Further, the ion exchanger of the present invention has a sufficient hydrophilicity since it has a large amount of hydroxyl groups. Hence, the ion exchanger of the present invention is advantageous in that it exhibits little hydrophobic adsorption of bio-substances, thereby being free from the disadvantageous non-specific adsorption of bio-substances.

The present invention will be explained in more detail with reference to the following Examples which should not be construed to be limiting the scope of the present invention.

EXAMPLE 1

Into a three-necked round bottomed flask equipped with a reflux condenser, a nitrogen inlet tube and a stirrer and having a capacity of 3 liters were charged a homogeneous liquid mixture consisting of 100 g of vinyl acetate, 45.4 g of triallyl isocyanurate, 80 g of n-butyl acetate, 40 g of decalin and 3.4 g of 2,2'-azobisisobutyronitrile and 800 ml of water containing, dissolved therein, 1.0 % by weight of polyvinyl alochol and 0.2 M of sodium phosphate, and the resulting mixture was sufficiently stirred. Then, the mixture was heated at 65° C. for 18 hours and at 75° C. for 5 hours while stirring to effect suspension polymerization, so that a granular copolymer was obtained. The copolymer thus obtained was filtered, and washed with water and then with acetone so that the residual monomers and the organic solvent were extracted. The granular copolymer was, together with a solution consisting of 2 liters of methanol and 65 g of sodium hydroxide, put in a 5-liter three-necked flask equipped with a reflux condenser, a nitrogen inlet tube and a stirrer, followed by stirring at 15° C. for 20 hours to saponify 55% of the ester groups of the copolymer to hydroxyl groups. The resulting saponified copolymer was filtered, washed with water and dried.

30 g of the obtained copolymer was charged in a 1000 ml three-necked flask equipped with a reflux condenser, a nitrogen inlet tube and a stirrer. Further, 300 ml of dimethyl sulfoxide, 50 ml of epichlorohydrin and 10 ml of a 30% by weight aqueous solution of sodium hydroxide were charged in the flask. The mixture was allowed to react at 30° C. for 20 hours while stirring. The resulting gel was filtered, washed with water and subjected to suction filtration. The granular gel obtained by the suction filtration was then charged in a 1000 ml three-necked flask equipped with a reflux condenser, a nitrogen inlet tube and a stirrer. Subsequently, 400 ml of a 10% by weight aqueous solution of diethylamine was put in the flask, and the mixture was allowed to react at 60° C. for 5 hours while stirring. The resulting granular product was filtered, washed with water, and subjected to classification thereby to obtain a crosslinked copolymer having a hydroxyl group and a tertiary amino group as a weakly basic anion exchange group, namely, an anion exchanger. The anion exchanger had an average grain diameter of 9.0 microns.

The properties of the thus obtained anion exchanger were determined in the manners described hereinbefore. The anion exchanger had a hydroxyl group content of 4.9 meq/g of the dry anion exchanger, an ion exchange group content of 0.5 meq/g of the dry anion exchanger, a water regain value of 1.9 g/g of the dry anion exchanger and a specific surface area of 95 m2/g of the dry anion exchanger.

The thus obtained anion exchanger was packed in a stainless steel column of 7.5 mm in inside diameter and 10cm in length. Using the column, ovalbumin (molecular weight: 45,000) and α-chymotrypsinogen A (molecular weight: 27,000) were subjected to chromatographic analysis which was conducted under the following conditions:

Mobile phase: Aqueous solution (pH 7.5) containing 50 mM
Tris-HCl buffer and 100 mM sodium chloride,
Flow rate of mobile phase: 2 ml/min,
Concentration of sample: 0.5% by weight,
Volume of sample: 100 μl, and
Column temperature: 30° C.

It was found that the elution volumes of ovalbumin and α-chymotrypsinogen A were respectively 5.0 ml and 2.1 ml. With respect to the terminology "elution volume", it may also be referred to as "eluate volume" or "retention volume" in the art. Such a substantial difference in elution volume ensures complete separation of the two bio-substances. The complete separation was confirmed by chromatographic analysis of a mixture of the above-mentioned ovalbumin and α-chymotrypsinogen A solutions. The recovery of each of these bio-substances was more than 90%.

For the purpose of comparison, the above-mentioned saponified copolymer to which the anion exchange group was not yet bonded was packed in a stainless steel column of 7.5 mm in inside diameter and 10 cm in length, and the column was employed to conduct chromatographic analysis of ovalbumin and α-chymotypsinogen A under the same conditions as mentioned above. The chromatogram showed that the elution volumes of ovalbumin and α-chymotrypsinogen A were 2.5 ml and 2.7 ml, respectively. Due to such a closeness in elution volume, these bio-substances could not be separated effectively.

Next, a 0.01 N aqueous NaOH solution was passed through the above-mentioned column packed with the anion exchanger at a flow rate of 1 ml/min at 30° C. for 16 hours. The column was then employed to conduct chromatographic analysis of ovalbumin and α-chymotrypsinogen A under the same conditions as mentioned above. The chromatogram showed that the elution volume of each of these bio-substances was substantially the same as that obtained prior to the passing of the 0.01 N aqueous NaOH solution. Their recoveries also did not change, and were determined to be more than 90% each. The anion exchanger was taken out from the column, and subjected to the measurements of the hydroxyl group content and the ion exchange group content. The values of hydroxyl group content and ion exchange group content remained substantially the same as those obtained prior to the passing of the NaOH solution. This substantiates that the anion exchanger according to the present invention is extremely stable in an alkaline solution.

In particular, as the pump for feeding the mobile phase, use was made of "HITACHI 638-30" (model number of a pump manufactured and sold by Hitachi Ltd., Japan). As the detector, use was made of "UVIDEC 100-N" (trade name of a detector manufactured and sold by Japan Spectroscopic Co., Ltd., Japan). The detection wavelength was 280 nm.

EXAMPLE 2

An anion exchanger having a tertiary amino group as the anion exchange group was prepared in substantially the same manner as in Example 1 except that the amount of epichlorohydrin was changed to 90 ml. The resulting anion exchanger had an anion exchange group content of 1.02 meq/g of the dry anion exchanger, a hydroxyl group content of 4.6 meq/g of the dry anion exchanger, a water regain value of 2.1 g/g of the dry anion exchanger and a specific surface area of 72 m$^2$/g of the dry anion exchanger.

EXAMPLES 3 AND 4

Saponified copolymers each having an epoxy group bonded thereto were prepared in substantially the same manner as in Example 1. The so-prepared copolymers were each reacted with ethylamine and ammonia under the reaction conditions as shown in Table 1, thereby obtaining anion exchangers having properties as indicated in Table 1.

Each of the above-obtained anion exchangers was packed in a stainless steel column of 7.5 mm in inside diameter and 10 cm in length, and used to conduct chromatographic analysis of ovalbumin and α-chymotrypsinogen A under substantially the same conditions as in Example 1. The elution volumes of ovalbumin and α-chymotrypsinogen A were as shown in Table 1.

From the results shown in Table 1, it is understood that ovalbumin and α-chymotrypsinogen A could be effectively separated.

On the other hand, in the same manner as in Example 1, a 0.01 N aqueous NaOH solution was passed through each of the columns packed with the above-obtained anion exchangers. After the passing of the aqueous NaOH solution, ovalbumin and α-chymotrypsinogen A were reanalyzed under the same conditions as in Example 1. The chromatogram showed that the elution volume of each of the bio-substances was substantially the same as that obtained prior to the passing of the 0.01 N aqueous NaOH solution. Each anion exchanger was then taken out from the column, and subjected to the measurements of the hydroxyl group content and the ion exchange group content. The values of hydroxyl group content and ion exchange group content remained substantially the same as those obtained prior to the passing of the NaOH solution.

TABLE 1

| Example No. | Epoxy group-bonded polymer (g) | Reagent | Reaction conditions | Ion exchange group content (meq/g) | Hydroxyl group content (meq/g) | Water regain value (g/g) | Specific surface area (m$^2$/g) | Ovalbumin elution volume (ml) | α-chymotrypsinogen elution volume (ml) |
|---|---|---|---|---|---|---|---|---|---|
| 3 | 30 | 10% aqueous | 60°/ | 0.52 | 5.4 | 1.9 | 110 | 4.5 | 2.2 |

TABLE 1-continued

| Example No. | Epoxy group-bonded polymer (g) | Reagent | Reaction conditions | Ion exchange group content (meq/g) | Hydroxyl group content (meq/g) | Water regain value (g/g) | Specific surface area (m$^2$/g) | Oval-bumin elution volume (ml) | α-chymo-trypsinogen elution volume (ml) |
|---|---|---|---|---|---|---|---|---|---|
| | | ethylamine solution (400 ml) | 5 hours | | | | | | |
| 4 | 30 | 10% aqueous ammonia solution (400 ml) | 60° C./ 5 hours | 0.58 | 5.2 | 1.9 | 56 | 4.0 | 2.1 |

EXAMPLE 5

An anion exchanger having a tertiary amino group was prepared in substantially the same manner as in Example 1. The so-prepared anion exchanger had an anion exchange group content of 0.5 meq/g of the dry exchanger, a hydroxyl group content of 5.5 meq/g of the dry exchanger and a water regain value of 1.6 g/g of the dry exchanger. 30 g of the anion exchanger was charged in a 1000 ml three-necked flask equipped with a reflux condenser, a nitrogen inlet tube and a stirrer. Then, to the anion exchanger were added 300 ml of acetone and 30 ml of methyl iodide. The mixture was allowed to react at 40° C. for 20 hours while stirring, thereby obtaining an anion exchanger having a quaternary ammonium salt group. The thus obtained anion exchanger had an anion exchange group content of 0.5 meq/g of the dry anion exchanger, a hydroxyl group content of 4.9 meq/g of the dry anion exchanger, a water regain value of 1.9 g/g of the dry anion exchanger and a specific surface area of 70 m$^2$/g of the dry anion exchanger.

EXAMPLE 6

A homogeneous liquid consisting of 100 g of vinyl acetate, 32.2 g of triallyl isocyanurate, 40 g of n-butyl acetate and 3.3 g of 2,2'-azobisisobutyronitrile was suspension polymerized and subjected to saponification reaction in substantially the same manner as in Example 1. 30 g of the obtained dry granular copolymer was reacted with epichlorohydrin in substantially the same manner as in Example 1. The reaction product was put in a three-necked flask having a capacity of 1000 ml and equipped with a reflux condenser, a nitrogen inlet tube and a stirrer and, to the product, 400 ml of a 10% by weight aqueous diethyl amine solution was added. While stirring, the mixture was allowed to react at 60° C. for 5 hours. The granular product was filtered off, washed with water and subjected to classification to obtain an anion exchanger having an average grain diameter of 10.1 microns. The obtained anion exchanger had an anion exchange group content of 0.1 meq/g of the dry exchanger, a water regain value of 1.2 g/g of the dry exchanger and a specific surface area of 15 m$^2$/g of the dry exchanger. The hydroxyl group content of the dry anion exchanger was 9.0 meq/g.

EXAMPLE 7

A homogeneous liquid mixture consisting of 100 g of vinyl acetate, 41.4 g of triallyl isocyanurate, 74 g of n-butyl acetate, 25 g of decane and 3.4 g of 2,2'-azobisisobutyronitrile was suspension polymerized and subjected to saponification reaction in substantially the same manner as in Example 1. 30 g of the obtained granular copolymer, together with 2.1 g of succinic anhydride, was added to 300 ml of pyridine, and heated while stirring at 60° C. for 16 hours to obtain a cation exchanger having carboxyl groups. The obtained cation exchanger had a cation exchange group content of 0.13 meq/g of the dry exchanger, a hydroxyl group content of 5.5 meq/g of the dry exchanger, a water regain value of 1.59 g/g of the dry exchanger and a specific surface area of 87 m$^2$/g of the dry exchanger.

The thus obtained cation exchanger (designated a in Table 2) was packed in a stainless steel column of 7.5 mm in inside diameter and 25 cm in length. Using the column, standard protein samples were subjected to chromatographic analysis which was conducted under the following conditions:

Mobile phase: Aqueous solution (pH 7.0) containing 0.1 M sodium phosphate and 0.3 M sodium chloride,
Flow rate of mobile phase: 1 ml/min,
Volume of sample: 100 μl, and
Column temperature: 30° C.

For the purpose of comparison, a column containing a copolymer (designated b in Table 2) to which carboxyl incorporation reaction was not effected was also tested. As is apparent from the results shown in Table 2, when the above-obtained exchanger (a) was used, the elution volume of human serum albumin increased and the recovery of immunoglobulin was high, as compared with those when the copolymer (b) was used. These values remained almost unchanged even after the passing of a 0.01 N aqueous NaOH solution through the column at a flow rate of 1.0 ml/min at 30° C. for 16 hours.

TABLE 2

| | Gel | | | |
|---|---|---|---|---|
| | a | | b | |
| Human serum protein | Elution volume (ml) | Recovery (%) | Elution volume (ml) | Recovery (%) |
| Immunoglobulin M | 4.31 | 85 | 4.25 | 65 |
| Haptoglobin | 5.25 | 100 | 5.20 | 93 |
| Immunoglobulin G | 6.00 | 91 | 5.95 | 96 |
| Transferrin | 6.31 | 97 | 6.20 | 94 |
| Albumin | 10.44 | 86 | 8.00 | 91 |

EXAMPLE 8

In substantially the same manner as in Example 7, a granular copolymer having hydroxyl groups was prepared by suspension polymerization and saponification reaction. 30 g of the granular copolymer was dispersed in 300 ml of an aqueous solution containing 4.5 g of chloroacetic acid and 7.4 g of sodium hydroxide, and heated at 30° C. for 16 hours to obtain a cation exchanger having carboxyl groups. The obtained cation exchanger had a cation exchange group content of 1.0 meq/g of the dry exchanger, a hydroxyl group content of 4.6 meq/g of the dry exchanger, a water regain value of 1.60 g/g of the dry exchanger and a specific surface area of 64 m$^2$/g of the dry exchanger.

EXAMPLE 9

A homogeneous liquid mixture consisting of 100 g of vinyl acetate, 32.2 g of triallyl isocyanurate, 40 g of n-butyl acetate and 3.3 g of 2,2'-azobisisobutyronitrile was suspension polymerized and subjected to saponification reaction in substantially the same manner as in Example 1. 30 g of the obtained dry granular copolymer, together with 8.5 g of succinic anhydride, was added to 300 ml of pyridine, and heated at 60° C. for 16 hours while stirring. The granular product was filtered off, washed with water and subjected to classification to obtain a cation exchanger having an average grain diameter of 9.2 microns. The thus obtained cation exchanger had a water regain value of 1.02 g/g of the dry exchanger and a specific surface area of 28 m$^2$/g of the dry exchanger. The contents of hydroxyl group and carboxyl group of the dry cation exchanger were 8.9 meq/g and 1.02 meq/g, respectively.

EXAMPLE 10

A homogeneous liquid mixture consisting of 100 g of vinyl acetate, 41.4 g of triallyl isocyanurate, 70 g of n-butyl acetate and 3.4 g of 2,2'-azobisisobutyronitrile was suspension polymerized and subjected to saponification reaction in substantially the same manner as in Example 1. 30 g of the obtained dry granular copolymer having hydroxyl groups was put in a three-necked flask having a capacity of 1000 ml and equipped with a reflux condenser, a nitrogen inlet tube and a stirrer. Further, 300 ml of dimethyl sulfoxide, 5 g of 1,3-propanesultone and 20 ml of a 30% by weight aqueous sodium hydroxide solution were put in the flask, and the mixture was heated at 30° C. for 20 hours while stirring. The granular product was filtered off, washed with water and subjected to classification to obtain a cation exchanger having sulfonic groups. The cation exchanger had an average grain diameter of 10.5 microns, a cation exchange group content of 0.5 meq/g of the dry exchanger, a water regain value of 1.2 g/g of the dry exchanger and a specific surface area of 65 m$^2$/g of the dry exchanger. The hydroxyl group content of the dry cation exchanger was 5.4 meq/g.

The thus obtained cation exchanger was packed in a stainless steel column of 7.5 mm in inside diameter and 10 cm in length. Using the column, myoglobin (molecular weight: 17000) and α-chymotrypsinogen A (molecular weight: 27000) were subjected to chromatographic analysis which was conducted under the following conditions:

Mobile phase: Aqueous solution (pH 6.0) containing 20 mM sodium phosphate and 100 mM sodium chloride,
Flow rate of mobile phase: 1.5 ml/min
Volume of sample: 100 μl, and
Column temperature: 30° C.

The chromatogram showed that the elution volumes of myoglobin and α-chymotrypsinogen A were respectively 3.2 ml and 15.1 ml. Hence, they could be completely separated.

For the purpose of comparison, the above-mentioned saponified copolymer to which the cation exchange group was not yet bonded was packed in a stainless steel column with the above-mentioned size. The column was employed to conduct chromatographic analysis of myoglobin and α-chymotrypsinogen A under the same conditions as mentioned above. The chromatogram showed that the elution volumes of myoglobin and α-chymotrypsinogen A were respectively 3.3 ml and 2.8 ml. Due to such a closeness in elution volume, these bio-substances could not be separated effectively.

Next, a 0.01 N aqueous sodium hydroxide solution was passed through the above-mentioned column packed with the cation exchanger at a flow rate of 1 ml/min at 30° C. for 16 hours. The column was then employed to conduct chromatographic analysis of myoglobin and α-chymotrypsinogen A under the same conditions as mentioned above. The chromatogram showed that the elution volume of each of these bio-substances was substantially the same as that obtained prior to the passing of the 0.01 N aqueous NaOH solution. Their recoveries also did not change, and were determined to be more than 90% each. The cation exchanger was taken out from the column, and subjected to the measurements of the hydroxyl group content and the cation exchange group content. The values of hydroxyl group content and cation exchanger group content remained substantially the same as those obtained prior to the passing of the NaOH solution. This substantiates that the cation exchanger according to the present invention is extremely stable in an alkaline solution.

In this Example, HITACHI 638 (model number of a pump manufactured and sold by Hitachi, Ltd., Japan) was used as the pump for feeding the mobile phase liquid. UVIDEC 100-N (tradename of a detector manufactured and sold by Japan Spectroscopic Co., Ltd., Japan) was used as the detector, in which the detection wavelength employed was 280 nm.

EXAMPLE 11

In substantially the same manner as described in Example 10, a cation exchanger having sulfonic groups was prepared except that instead of 5 g of 1,3-propanesultone and 20 ml of a 30% by weight aqueous sodium hydroxide solution, 15 g of propanesultone and 60 ml of a 30% by weight aqueous sodium hydroxide solution were respectively used. The obtained cation exchanger had a cation exchange group content of 1.35 meq/g of the dry exchanger, a water regain value of 1.3 g/g of the dry exchanger and a specific surface area of 91 m$^2$/g of the dry exchanger. The hydroxyl group content of the dry cation exchanger was 4.5 meq/g.

EXAMPLE 12

A homogeneous liquid mixture consisting of 100 g of vinyl acetate, 32.2 g of triallyl isocyanurate, 40 g of n-butyl acetate and 3.3 g of 2,2'-azobisisobutyronitrile was suspension polymerized and subjected to saponification reaction in the same manner as in Example 1. 30 g of the obtained dry granular copolymer was put in a three-necked flask having a capacity of 1000 ml and equipped with a reflux condenser, a nitrogen inlet tube and a stirrer. Further, 300 ml of dimethyl sulfoxide, 2 g of 1,3-propanesultone and 5 ml of a 30% by weight aqueous sodium hydroxide solution were put in the flask, and the mixture was heated at 30° C. for 20 hours while stirring. The obtained granular product was filtered off, washed with water and subjected to classification to obtain a cation exchanger having an average grain diameter of 9.1 microns. The obtained cation exchanger had a cation exchange group content of 0.1 meq/g of the dry exchanger, a water regain value of 1.2 g/g of the dry exchanger and a specific surface area of 12 m²/g of the dry exchanger. The hydroxyl group content of the dry cation exchanger was 9.0 meq/g.

What is claimed is:

1. An ion exchanger which comprises:
a matrix comprising a backbone structure and functional groups bonded to said backbone structure, said matrix being a totally porous organic synthetic crosslinked copolymer of vinyl compound monomer units and crosslinkable monomer units;
an alcoholic hydroxyl group bonded directly to said backbone structure, the content of said hydroxyl group being in the range of 1.0 to 14.0 meq/g of the dry ion exchanger; and
an ion exchange group bonded to said matrix, the content of said ion exchange group being in the range of 0.02 to 5.0 meq/g of the dry ion exchanger, and
wherein said ion exchanger has a water regain value of 0.5 to 4.0 g/g of the dry ion exchanger and a specific surface area of 5 to 1000 m²/g of the dry ion exchanger.

2. An ion exchanger according to claim 1, wherein said hydroxyl group is bonded to a carbon atom of a repeating unit of the formula

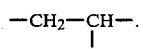

3. An ion exchanger according to claim 1, wherein said ion exchange group is at least one member selected from the class consisting of weakly acidic cation exchange groups, weakly basic anion exchange groups, strongly acidic cation exchange groups and strongly basic anion exchange groups.

4. An ion exchanger according to claim 1, wherein said ion exchange group is at least one member selected from the class consisting of a carboxyl group, a phosphoric group, a primary amino group, a secondary amino group, a tertiary amino group, a sulfonic group and a quaternary ammonium salt group.

5. An ion exchanger according to claim 1, wherein said matrix has a crosslinking index (X) in the range satisfying an inequality $0.05 \leq X \leq 0.4$,
said crosslinking index (X) being defined by the formula $$\frac{nb}{a + nb}$$

in which
a represents the molar fraction of the total monomer units minus the crosslinkable monomer units relative to the total monomer units constituting the matrix,
b represents the molar fraction of the crosslinkable monomer units relative to the total monomer units constituting the matrix, and
n represents the number of functional groups active in chain extension which are contained in a molecule of crosslinkable monomer that forms the crosslinkable monomer units upon polymerization.

6. An ion exchanger according to claim 1, wherein each of said crosslinkable monomer units contains an isocyanurate ring or triazine ring.

7. An ion exchanger according to claim 2, wherein the content of the hydroxyl group, contained in the vinyl alcohol monomer units, is in the range of 1.0 to 11.0 meq/g of the dry ion exchanger.

8. An ion exchanger according to claim 1, wherein the content of the ion exchange group is in the range of 0.05 to 2.0 meq/g of the dry ion exchanger.

9. An ion exchanger according to claim 1, wherein the ion exchanger has a water regain value of 0.5 to 3.0 g/g of the dry ion exchanger.

10. An ion-exchanger according to claim 1, wherein the hydroxyl group content is 4.9 meq/g of the dry ion exchanger.

11. An ion exchanger according to claim 1, wherein the ion exchange group content is 0.5 meq/g, the water regain value is 1.9 g/g and the specific surface area is 95 m²/g of the dry anion exchanger.

12. An ion exchanger according to claim 5, wherein said crosslinking index is from 0.2 to 0.4.

13. An ion exchanger according to claim 1, wherein said ion exchanger is in a granular form and has a weight average granule size of from 3 to 20 microns.

14. An ion exchanger which comprises:
a matrix comprising a backbone structure and functional groups bonded to said backbone structure, said matrix being a totally porous organic synthetic crosslinked copolymer of vinyl compound monomer units and crosslinkable monomer units;
an alcoholic hydroxyl group bonded directly to said backbone structure and bonded to a carbon atom of a repeating unit of the formula

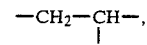

the content of said hydroxyl group being in the range of 1.0 to 14.0 meq/g of the dry ion exchanger; and
an ion exchange group bonded to said matrix, the content of said ion exchange group being in the range of 0.02 to 5.0 meq/g of the dry ion exchanger, and
wherein said ion exchanger has a water regain value of 0.5 to 4.0 g/g of the dry ion exchanger and a specific surface area of 5 to 1000 m²/g of the dry ion exchanger.

15. An ion exchanger according to claim 14, wherein said matrix has a crosslinking index (X) in the range satisfying an inequality of $0.05 \leq X \leq 0.4$,
said crosslinking index (X) being defined by the formula $$\frac{nb}{a + nb}$$

in which a represents the molar fraction of the total monomer units minus the crosslinkable monomer units relative to the total monomer units constituting the matrix, b represents the molar fraction of the crosslinkable monomer units relative to the total monomer units constituting the matrix, and n represents the number of functional groups active in chain extension which are contained in a molecule of crosslinkable monomer that forms the crosslinkable monomer units upon polymerization.

16. An ion exchanger according to claim 14, wherein each of said crosslinkable monomer units contains an isocyanurate ring or triazine ring.

17. An ion exchanger according to claim 14, wherein the content of the hydroxyl group, contained in the vinyl alcohol monomer units, is in the range of 1.0 to 11.0 meq/g of the dry ion exchanger.

18. An ion exchanger according to claim 14, wherein the content of the ion exchange group is in the range of 0.05 to 2.0 meq/g of the dry ion exchanger.

19. An ion exchanger according to claim 14, wherein the ion exchanger has a water regain value of 0.5 to 3.0 g/g of the dry ion exchanger.

* * * * *